United States Patent
Kawamura

(10) Patent No.: US 10,647,589 B2
(45) Date of Patent: May 12, 2020

(54) POLYOXOMETALATE AND METHOD FOR PRODUCING POLYOXOMETALATE

(71) Applicant: JX NIPPON MINING & METALS CORPORATION, Tokyo (JP)

(72) Inventor: Toshifumi Kawamura, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

(21) Appl. No.: 15/563,443

(22) PCT Filed: Mar. 30, 2016

(86) PCT No.: PCT/JP2016/060583
§ 371 (c)(1),
(2) Date: Sep. 29, 2017

(87) PCT Pub. No.: WO2016/159195
PCT Pub. Date: Oct. 6, 2016

(65) Prior Publication Data
US 2018/0065862 A1 Mar. 8, 2018

(30) Foreign Application Priority Data

Mar. 31, 2015 (JP) ................................ 2015-072078
Jan. 19, 2016 (JP) ................................ 2016-007534

(51) Int. Cl.
*C01G 41/02* (2006.01)
*C01G 31/02* (2006.01)
(Continued)

(52) U.S. Cl.
CPC .......... *C01G 41/02* (2013.01); *C01B 21/0821* (2013.01); *C01G 31/006* (2013.01);
(Continued)

(58) Field of Classification Search
CPC ...... C01G 41/02; C01G 31/006; C01G 31/02; C01G 39/006; C01G 39/02;
(Continued)

(56) References Cited

U.S. PATENT DOCUMENTS 6,042,805 A 3/2000 Lampe-Onnerud
6,676,821 B1 1/2004 Hempelmann et al.

FOREIGN PATENT DOCUMENTS

DE 10 2004 037 478 A1 8/2006
GB 848462 * 9/1957
(Continued)

OTHER PUBLICATIONS

Hiraga, Crystal structure vanadium suboxide V2O1+-x, 1975, Journal of Solid State Chemistry, 14, 219-228 (Year: 1975).*
(Continued)

*Primary Examiner* — James A Fiorito
(74) *Attorney, Agent, or Firm* — Birch, Stewart, Kolasch & Birch, LLP

(57) ABSTRACT

Provided is a novel polyoxometalate and a method for producing the polyoxometalate. The polyoxometalate is represented by the compositional formula: $M_xO_y$ in which M is tungsten, molybdenum or vanadium; $4 \leq x \leq 1000$; and $2.5 \leq y/x \leq 7$.

15 Claims, 2 Drawing Sheets

(51) Int. Cl.
*C01G 39/02* (2006.01)
*C01G 41/00* (2006.01)
*C01G 31/00* (2006.01)
*C25C 1/06* (2006.01)
*C01G 39/00* (2006.01)
*C25C 1/08* (2006.01)
*C25C 1/10* (2006.01)
*C25C 7/02* (2006.01)
*C25B 1/00* (2006.01)
*C01B 21/082* (2006.01)

(52) U.S. Cl.
CPC ............ *C01G 31/02* (2013.01); *C01G 39/006* (2013.01); *C01G 39/02* (2013.01); *C01G 41/006* (2013.01); *C25B 1/00* (2013.01); *C25C 1/06* (2013.01); *C25C 1/08* (2013.01); *C25C 1/10* (2013.01); *C25C 7/02* (2013.01)

(58) Field of Classification Search
CPC ......... C01B 21/0821; C25B 1/00; C25B 1/06; C25B 1/08; C25B 1/10; C25B 7/02
See application file for complete search history.

(56) References Cited

FOREIGN PATENT DOCUMENTS

| JP | 50-97597 A | 8/1975 |
|---|---|---|
| JP | 10-509942 A | 9/1998 |
| JP | 2002-524661 A | 8/2002 |
| JP | 2005-8441 A | 1/2005 |
| JP | 2007-112666 A | 5/2007 |
| JP | 4816505 B2 | 11/2011 |
| JP | 4911994 B2 | 4/2012 |
| JP | 2013-36111 A | 2/2013 |
| JP | 2014-70261 A | 4/2014 |
| WO | WO 2014/001786 A1 | 1/2014 |

OTHER PUBLICATIONS

Wikipedia https://en.wikipedia.org/wiki/Polyoxometalate (Year: 2019).*
English translation of the International Preliminary Report on Patentability and Written Opinion of the International Searching Authority (Forms PCT/IB/338, PCT/IB/373 and PCT/ISA/237) dated Oct. 12, 2017, for International Application No. PCT/JP2016/060583.
English translation of the Taiwanese Office Action for Taiwanese Application No. 105110262, dated Sep. 21, 2016.
Extended European Search Report, dated Aug. 30, 2018, for the corresponding European Application No. 16773076.1.
International Search Report (Form PCT/ISA/210) for International Application No. PCT/JP2016/060583, dated Jun. 21, 2016.
Parreira et al., "TEM Characterization of W—O—N Coatings," Microsc. Microanal., vol. 14, Issue Supp. 3, 2008, pp. 27-30 (5 pages total).
Wang et al., "Electrochemical Study of Isopoly- and Heteropoly-oxometallate Film Modified Microelectrodes—Part 2. Electrochemical Behaviour of Isopolymolybdic Acid Monolayer Modified Carbon Fibre Microelectrodes," Electrochimica Acta, vol. 37, No. 10, 1992, pp. 1859-1864.
Yamase et al., "Photochemical self-assembly reactions of polyoxovanadates Structure of $MoO_4^{2-}$-encapsulated mixed-valent cluster $[V_{22}O_{54}(MoO_4)]^{8-}$ and template-exchange reaction of $[V_{18}O_{42}(H_2O)]^{12-}$," Journal of Molecular Catalysis A: Chemical, vol. 147, 1999, pp. 179-190.

* cited by examiner

POLYOXOMETALATE AND METHOD FOR PRODUCING POLYOXOMETALATE

TECHNICAL FIELD

The present invention relates to a polyoxometalate and a method for producing the polyoxometalate.

BACKGROUND ART

A polyoxometalate is composed of basic units consisting of $MO_4$ tetrahedra, $MO_5$ square pyramids, $MO_6$ hexahedra or $MO_5$ trigons in which oxygen atoms are 4-, 5- or 6-co-ordinated to metal atoms and the like. The basic units can be crosslinked by the oxygen atoms through dehydration condensation reaction and linked via vertices, edges or faces, so as to form polyoxometalates having various structures. Thus, recently, research and development of the polyoxometalate has been actively conducted since it can be utilized for various applications (Patent Document 1 and the like).

CITATION LIST

Patent Literature

Patent Document 1: Japanese Patent No. 4911994 B1

SUMMARY OF THE INVENTION

Technical Problem

However, there still remains a need for development of a novel polyoxometalate and there is still room for development of a technique of efficiently producing the polyoxometalate. Therefore, an object of the present invention is to provide a novel polyoxometalate and a method for producing the polyoxometalate.

Solution to Problem

As a result of intensive studies to solve the above problems, the present inventors have found that a novel polyoxometalate can be efficiently produced by subjecting a raw material mixture comprising at least one valuable containing a certain metal to electrolysis using a certain electrolytic solution to dissolve the metal in the electrolytic solution and then adding a poor solvent to the electrolytic solution.

In one aspect, the present invention completed on the basis of the above findings provides a polyoxometalate represented by the compositional formula: $M_xO_y$ in which M is tungsten, molybdenum or vanadium; $4 \leq x \leq 1000$; and $2.5 \leq y/x \leq 7$.

In another aspect, the present invention provides a polyoxometalate represented by the compositional formula: $M_xO_yN_z$ in which M is tungsten, molybdenum or vanadium; $4 \leq x \leq 1000$; $2.5 \leq y/x \leq 7$; and $0.5 \leq z/x \leq 2$.

In a further aspect, the present invention provides a method for producing a polyoxometalate, comprising subjecting a raw material mixture comprising at least one valuable containing tungsten, molybdenum or vanadium to electrolysis using an organic electrolytic solution to dissolve tungsten, molybdenum or vanadium in the electrolytic solution; and adding a poor solvent to the electrolytic solution in which tungsten, molybdenum or vanadium has been dissolved, to produce a polyoxometalate of tungsten, molybdenum or vanadium.

In one embodiment of the method for producing the polyoxometalate according to the present invention, the poor solvent may be an alcohol, an acetone, an ether, an amine or an ester.

In another embodiment of the method for producing the polyoxometalate according to the present invention, the organic electrolytic solution may be an organic alkaline electrolytic solution.

In yet another embodiment of the method for producing the polyoxometalate according to the present invention, the organic alkaline electrolytic solution may contain at least one alcohol amine.

In a further embodiment of the method for producing the polyoxometalate according to the present invention, the at least one alcohol amine may be monoethanolamine and/or triethanolamine.

In yet another embodiment of the method for producing the polyoxometalate according to the present invention, a concentration of the alcohol amine in the electrolytic solution may be from 1 to 80% by mass.

In yet another embodiment of the method for producing the polyoxometalate according to the present invention, the raw material mixture may contain from 1 to 30% by mass of at least one valuable other than tungsten, molybdenum or vanadium.

In yet another embodiment of the method for producing the polyoxometalate according to the present invention, the raw material mixture may contain from 1 to 10% by mass of at least one valuable other than tungsten, molybdenum or vanadium.

In yet another embodiment of the method for producing the polyoxometalate according to the present invention, the raw material mixture may contain from 3 to 10% by mass of at least one valuable other than tungsten, molybdenum or vanadium.

In yet another embodiment of the method for producing the polyoxometalate according to the present invention, the electrolysis may be carried out by adjusting a temperature of the electrolytic solution to 20 to 80° C.

In yet another embodiment of the method for producing the polyoxometalate according to the present invention, the electrolytic solution may have a pH of 7 or more.

In a further embodiment of the method for producing the polyoxometalate according to the present invention, an anode used in the electrolysis may be a titanium basket provided with the raw material mixture comprising the at least one valuable containing tungsten, molybdenum or vanadium.

Advantageous Effects of Invention

According to the present invention, it is possible to provide a novel polyoxometalate and a method for producing the polyoxometalate.

DESCRIPTION OF EMBODIMENTS

Hereinafter, embodiments of the method for producing the polyoxometalate according to the present invention will be described in detail.

First, a raw material mixture to be treated is prepared, which contains at least one valuable containing tungsten, molybdenum or vanadium. Examples of the raw material mixture containing the at least one valuable containing tungsten, molybdenum or vanadium include so-called recycled materials obtained by pulverizing tungsten scrap, molybdenum scrap or vanadium scrap, and the like. For example, the raw material mixture containing the at least one valuable containing tungsten, molybdenum or vanadium to be treated according to the present invention may contain from 0 to 15% by mass of cobalt, from 0 to 5% by mass of nickel, from 0 to 5% by mass of iron, from 0 to 5% by mass of titanium, and form 0 to 15% by mass of tantalum, and have the tungsten, molybdenum or vanadium content of from 3 to 95% by mass. Further, the raw material mixture containing the at least one valuable containing tungsten, molybdenum or vanadium to be treated according to the present invention may contain from 1 to 30% by mass of at least one valuable other than tungsten, molybdenum or vanadium, or from 1 to 10% by mass of at least one valuable other than tungsten, molybdenum or vanadium, or from 3 to 10% by mass of at least one valuable other than tungsten, molybdenum or vanadium.

Figure 1:
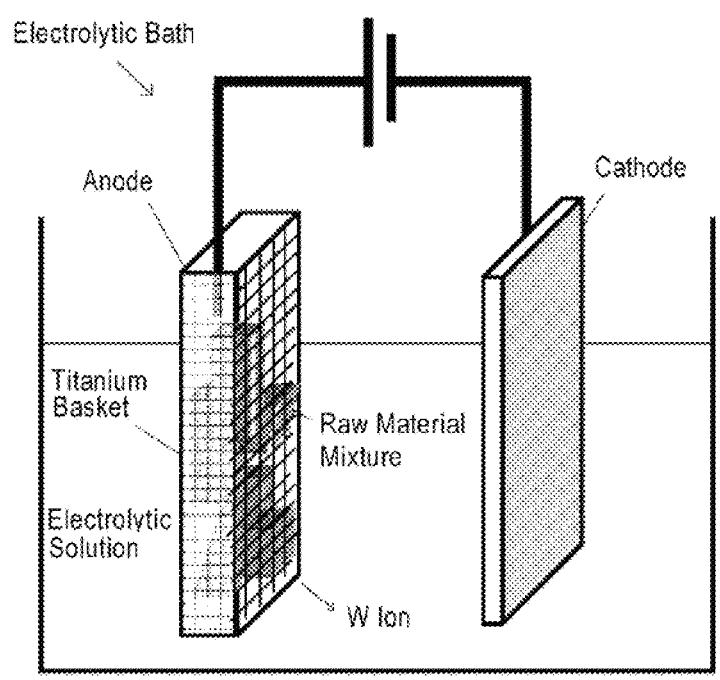
FIG. 1 is a schematic view of an example of an electrolytic bath according to an embodiment of the present invention.

Then, an electrolytic bath provided with an anode, a cathode and an electrolytic solution is prepared, and the bath is used to carry out electrolysis of the raw material mixture containing the at least one valuable containing tungsten, molybdenum or vanadium. The electrolytic bath is not particularly limited, but may be, for example, the configuration as shown in FIG. 1. In FIG. 1, a titanium basket is used as the anode, and the raw material mixture containing the at least one valuable containing tungsten, molybdenum or vanadium is provided in the titanium basket. The titanium basket is preferable in that it is stable under high voltage, high current and high temperature electrolytic processing conditions of the present invention.

The electrolytic solution employs an organic electrolytic solution. The organic electrolytic solution may be preferably an alkaline electrolytic solution, and more preferably may contain at least one alcohol amine. Examples of the alcohol amine include triethanolamine, diethanolamine, monoethanolamine, aminopropanol, methylethanolamine and the like. In particular, monoethanolamine and triethanolamine are preferable because they are inexpensive.

When the alcohol amine is used for the electrolytic solution, the treatment reaction system of electrolysis does not contain impurities such as Na, K, Fe and S, so that the polyoxometalate of high purity tungsten, molybdenum or vanadium can be produced. In addition, the electrolytic solution has high voltage endurance and is stable, and also has low pH dependency, so that easy controlling of electrolysis can be achieved, and the electrolytic solution does not need supplement due to volatilization that will be required when the electrolytic solution is ammonia, so that a low cost processing can be achieved. Although a clear reason why the alcohol amine electrolytic solution has high voltage endurance and is stable is not known, the reason would be possibly because the electrolytic solution is stabilized by coordinating the dissolved tungsten, molybdenum or vanadium with the alcohol amine.

The concentration of the alcohol amine in the electrolytic solution may be preferably from 1 to 80% by mass. If the concentration of the alcohol amine in the electrolytic solution is less than 1% by mass, conductivity will excessively decreased and electrolysis will become unstable, so that complex formation may be difficult. If the concentration of the alcohol amine in the electrolytic solution is more than 80% by mass, solubility in water will be exceeded depending on the type of the electrolytic solution and the concentration will be unnecessarily increased, which will be disadvantageous in terms of costs. The concentration of the alcohol amine in the electrolytic solution may be more preferably from 2 to 50% by mass, and still more preferably from 5 to 40% by mass, and still more preferably from 5 to 20% by mass.

The temperature of the electrolytic solution during electrolysis may be adjusted to 20 to 80° C. to carry out the electrolysis. The temperature of the electrolytic solution of 20 to 80° C. may stabilize the alcohol amine and satisfactorily suppress volatilization of the alcohol amine. Therefore, the points where the electrolytic solution does not volatilize and is stable and has few impurities in the electrolysis reaction are very advantageous for the processes of producing the polyoxometalate of high purity tungsten, molybdenum or vanadium and separating and recovering other valuables, in terms of a total cost. The temperature of the electrolytic solution may be more preferably set to an elevated temperature of 60° C. or higher in terms of the electrolysis rate. For example, ammonia aggressively volatilizes at 50° C. or higher and requires a large amount of supplement, but the alcohol amine based electrolytic solution has a higher boiling point and is hard to volatilize, so that the alcohol amine based electrolytic solution can be used at 60° C. or higher without any problem.

The pH of the electrolytic solution is adjusted such that the electrolytic solution is weakly alkaline, and is preferably 7 or more. If the pH is less than 7, a tungstate ion, a molybdate ion or vanadate ion produced will become difficult to be dissolved, and will be precipitated as $WO_3$ or $H_2WO_4$, $MoO_3$ or $H_2MoO_4$, and as a result, electrolytic dissolution may be inhibited.

Figure 2:
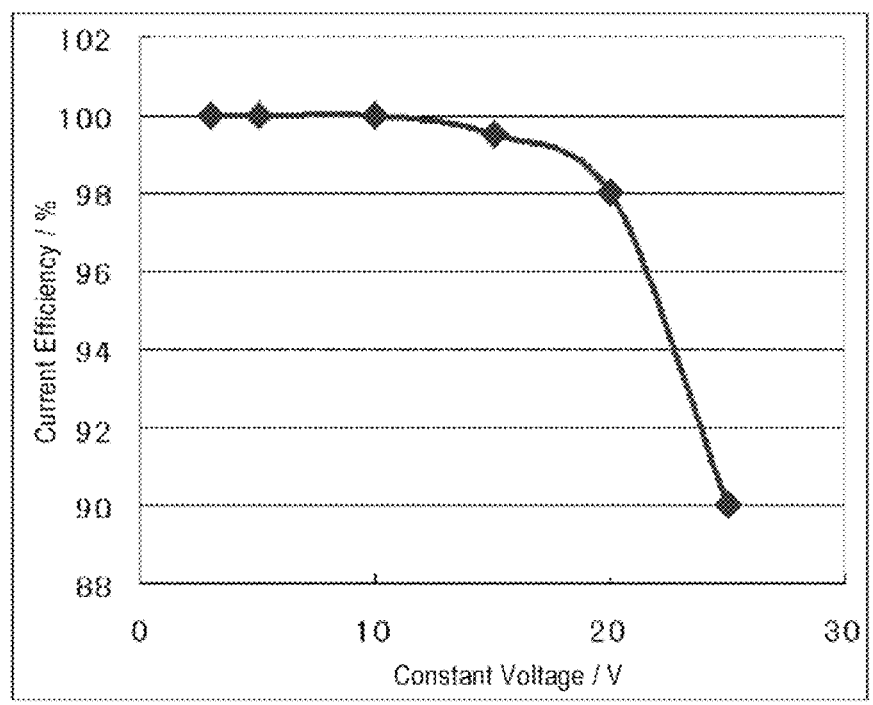
FIG. 2 is a diagram showing a relationship between constant voltage and current efficiency in electrolysis.

The alcohol amines used in the electrolytic solution have high voltage endurance and high current density resistance. For high productivity, higher set voltage and higher set current density in electrolysis is preferred, but practically, the set voltage may be 20 V or less and the set current density may be 500 A/dm$^2$ in view of limitations of facilities and damages to the cathode side. As a reference, FIG. 2 shows the relationship between constant voltage and current efficiency in the electrolysis.

Thus, by conducting electrolysis of the raw material mixture containing the at least one valuable containing tungsten, molybdenum or vanadium using the electrolyte solution containing the alcohol amine, the tungsten, molybdenum or vanadium can be dissolved in the electrolytic solution while at the same time electrodepositing a part of the valuable(s) onto the cathode used for the electrolysis. Further, the at least one valuable other the valuable(s) electrodeposited onto the cathode by the electrolysis can be a residue in the electrolytic solution. Thus, the tungsten, molybdenum or vanadium component in a certain form and other valuable can be separated and recovered at once from the raw material mixture containing tungsten, molybdenum or vanadium and the other valuable.

The polyoxometalate is produced from the electrolytic solution containing the dissolved tungsten, molybdenum or vanadium component by a crystallization method. The crystallization method is a method in which a poor solvent (which refers to a solvent that does not dissolve a solute and is compatible with a main solvent) is added to a solution containing a target compound (the solute), thereby lowering the solubility of the solute in the original solvent to precipitate the solute component. More particularly, the polyoxometalate of tungsten, molybdenum or vanadium is obtained as a crystallized substance by adding the poor solvent to the electrolytic solution containing the dissolved tungsten, molybdenum or vanadium component. The poor solvent is not particularly limited as long as the solubility of tungsten, molybdenum or vanadium in the electrolytic solution can be lowered. For example, the poor solvent that can be used includes polyethylene glycol (PEG), ethylene glycol (EG), alcohols such as lower alcohols, acetones, ethers, amines, esters and the like which are organic solvents soluble in water, in terms of impurity-free.

According to the method for producing the polyoxometalate of the present invention, the polyoxometalate is directly obtained as a crystallized substance by simply adding the poor solvent to the electrolytic solution in which the tungsten, molybdenum or vanadium component has been dissolved. Therefore, the method according to the present invention has very good production efficiency.

On the other hand, the valuable electrodeposited onto the cathode used for electrolysis may be one or more selected from the group consisting of cobalt, nickel, iron and chromium, for example. These valuables can be separated from tungsten, molybdenum or vanadium that can be easily dissolved in the electrolytic solution, and other residue, by a known method such as controlling of the pH in the acid-leaching to an alkaline side. Further, when the cathode used for electrolysis is made of, for example, titanium, stainless steel, iridium, niobium or zirconium, the above cobalt, nickel, iron or like can be satisfactorily electrodeposited, which is preferred.

The at least one valuable (other than the polyoxometalate of tungsten, molybdenum or vanadium) that is the residue in the electrolytic solution may be, for example, one or more selected from the group consisting of titanium, tantalum and silica. These valuables are electrolytically inactive, so that they can be easily separated as the residue without special treatment.

In another aspect, the polyoxometalate produced by the above production method according to the present invention is represented by the compositional formula: $M_xO_y$, in which M is tungsten, molybdenum or vanadium; $4 \leq x \leq 1000$; and $2.5 \leq y/x \leq 7$.

In another aspect, the polyoxometalate produced by the above production method according to the present invention is represented by the compositional formula: $M_xO_yN_z$ in which M is tungsten, molybdenum or vanadium; $4 \leq x \leq 1000$; $2.5 \leq y/x \leq 7$; and $0.5 \leq z/x \leq 2$.

The upper limit of x is preferably 1000 or less because the polyoxometalate may be clustered to form macromolecule. In view of stabilization of the polyoxometalate, x may be more preferably 500 or less, and further preferably 250 or less, and even more preferably 125 or less.

As stated above, the polyoxometalate according to the present invention is composed of basic units consisting of $MO_4$ tetrahedra, $MO_5$ square pyramids, $MO_6$ hexahedra or $MO_5$ trigons in which oxygen atoms are 4-, 5- or 6-coordinated to metal atoms and the like. Thus, the polyoxometalate according to the present invention can form various structures by crosslinking the basic units by the oxygen atoms through dehydration condensation reaction and linking the basic units via vertices, edges or faces. Therefore, the polyoxometalate according to the present invention can be utilized for various applications such as molecular capsules, pharmaceuticals, light emitting elements, chromic elements, electronic materials, and (photo) catalysts.

EXAMPLE

Hereinafter, Examples of the present invention will be described, but the Examples are merely for the purpose of illustration and are not intended to limit the present invention.

Example 1

10 kg of super hard material scrap having the contents as shown in Table 1 was placed in a titanium basket to prepare an anode for an electrolytic bath.

A titanium plate was used as a cathode for the electrolytic bath.

10% by mass of monoethanolamine was used as an electrolytic solution which was prepared by adding pure water to the monoethanolamine to bring about 20 L.

Electrodissolution was carried out at a current density of 5 A/dm² and a constant current of 100 A at a temperature of 70° C. for 10 hours.

As a result, metallic cobalt was deposited on the surface of the titanium plate of the cathode. Further, tungsten was dissolved in the electrolytic solution, and a residue was generated in the electrolytic solution. In addition, the amount of tungsten dissolved was 0.6 kg, and the current efficiency was substantially 100%.

5 L of ethanol as the poor solvent was added to 10 L of the electrolytic solution and stirred at room temperature to obtain a white precipitate. The white precipitate was dried and then measured by XRD, demonstrating that the white precipitate was a compound based on a polyoxometalate of tungsten.

TABLE 1

| W mass % | Co mass % | Ni mass % | Ta mass % | Fe mass % |
|---|---|---|---|---|
| 80 | 12 | 1 | 2 | 1 |

Example 2

The same treatments as those of Example 1 were carried out with the exception that the poor solvent to be added was acetone. The measurement of the resulting white precipitate demonstrated that the white precipitate was a compound based on a polyoxometalate of tungsten.

What is claimed is:

1. A method for producing a polyoxometalate, comprising:
    subjecting a raw material mixture comprising at least one valuable containing tungsten, molybdenum or vanadium to electrolysis using an organic electrolytic solution containing at least one alcohol amine to dissolve tungsten, molybdenum or vanadium in the electrolytic solution; and
    adding a poor solvent including an alcohol, an acetone, an ether, an amine or an ester to the electrolytic solution in which tungsten, molybdenum or vanadium has been dissolved, to produce a precipitate of a polyoxometalate of tungsten, molybdenum or vanadium.

2. The method for producing the polyoxometalate according to claim 1, wherein the at least one alcohol amine is monoethanolamine and/or triethanolamine.

3. The method for producing the polyoxometalate according to claim 1, wherein a concentration of the alcohol amine in the electrolytic solution is from 1 to 80% by mass.

4. The method for producing the polyoxometalate according to claim 1, wherein the raw material mixture contains from 1 to 30% by mass of at least one valuable other than tungsten, molybdenum or vanadium.

5. The method for producing the polyoxometalate according to claim 4, wherein the raw material mixture contains from 1 to 10% by mass of at least one valuable other than tungsten, molybdenum or vanadium.

6. The method for producing the polyoxometalate according to claim 5, wherein the raw material mixture contains from 3 to 10% by mass of at least one valuable other than tungsten, molybdenum or vanadium.

7. The method for producing the polyoxometalate according to claim 1, wherein the electrolysis is carried out by adjusting a temperature of the electrolytic solution to 20 to 80° C.

8. The method for producing the polyoxometalate according to claim 1, wherein the electrolytic solution has a pH of 7 or more.

9. The method for producing the polyoxometalate according to claim 1, wherein an anode used for the electrolysis is a titanium basket provided with the raw material mixture containing the at least one valuable containing tungsten, molybdenum or vanadium.

10. The method for producing the polyoxometalate according to claim 1, wherein the organic electrolytic solution is an organic alkaline electrolytic solution.

11. The method for producing the polyoxometalate according to claim 2, wherein a concentration of the alcohol amine in the electrolytic solution is from 1 to 80% by mass.

12. The method for producing the polyoxometalate according to claim 1, wherein the raw material mixture contains from 1 to 30% by mass of at least one valuable other than tungsten.

13. The method for producing the polyoxometalate according to claim 1, wherein the raw material mixture contains from 1 to 30% by mass of at least one valuable other than molybdenum.

14. The method for producing the polyoxometalate according to claim 1, wherein the raw material mixture contains from 1 to 30% by mass of at least one valuable other than vanadium.

15. The method for producing the polyoxometalate according to claim 2, wherein the raw material mixture contains from 1 to 30% by mass of at least one valuable other than tungsten, molybdenum or vanadium.

* * * * *